(No Model.) 2 Sheets—Sheet 1.

M. L. ROTHSCHILD.
AIR BRAKE APPARATUS.

No. 515,616. Patented Feb. 27, 1894.

Witnesses
G. W. Rea
Robert Emett

Inventor
Moses L. Rothschild.
By Geo. H. Lothrop.
Atty.

(No Model.) 2 Sheets—Sheet 2.

M. L. ROTHSCHILD.
AIR BRAKE APPARATUS.

No. 515,616. Patented Feb. 27, 1894.

Witnesses
G. W. Rea
Robert Everett

Inventor
Moses L. Rothschild.
By Geo. H. Lothrop.
Atty.

UNITED STATES PATENT OFFICE.

MOSES L. ROTHSCHILD, OF CHICAGO, ILLINOIS, ASSIGNOR TO THE GENETT AIR BRAKE COMPANY, OF ILLINOIS.

AIR-BRAKE APPARATUS.

SPECIFICATION forming part of Letters Patent No. 515,616, dated February 27, 1894.

Application filed August 4, 1892. Serial No. 442,193. (No model.)

*To all whom it may concern:*

Be it known that I, MOSES L. ROTHSCHILD, of Chicago, in the county of Cook and State of Illinois, have invented a new and useful Improvement in Air-Brake Apparatus, of which the following is a specification.

My invention consists in an improvement in air brake apparatus, hereinafter fully described and claimed.

Figure 1:
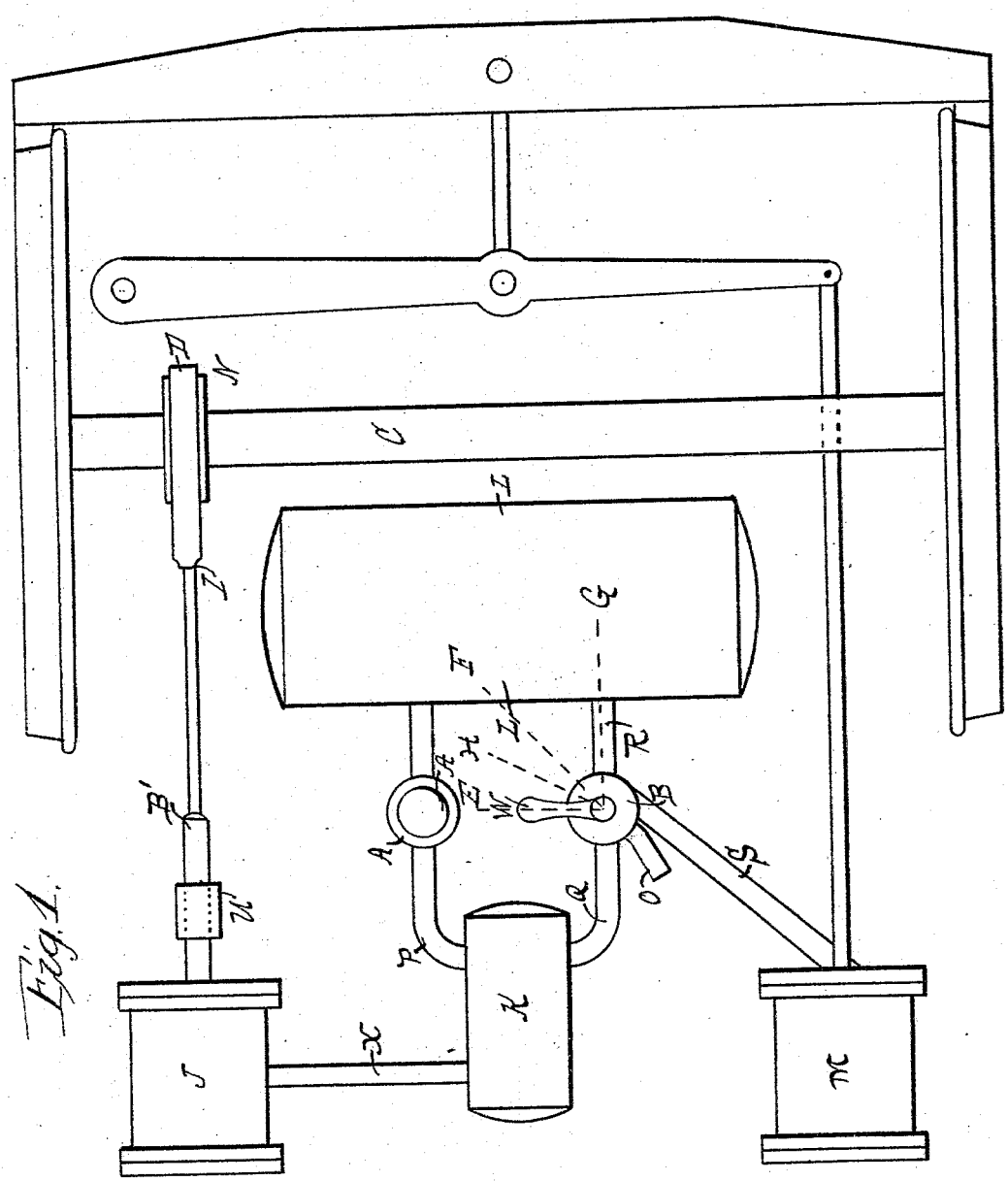
Figure 6:
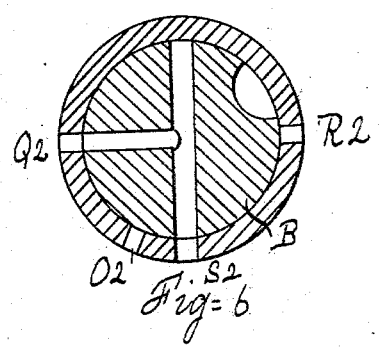
Figure 5:
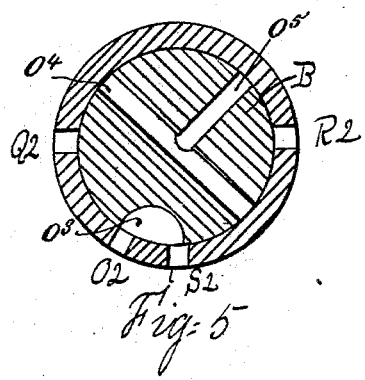
Figure 3:
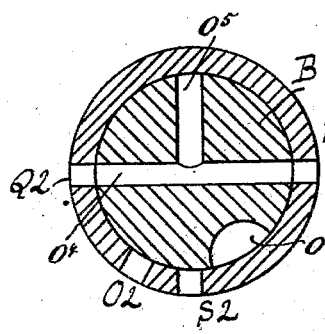
Figure 4:
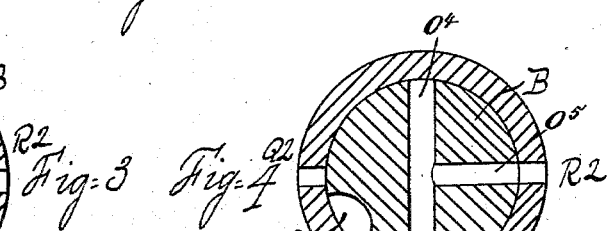
Figure 2:
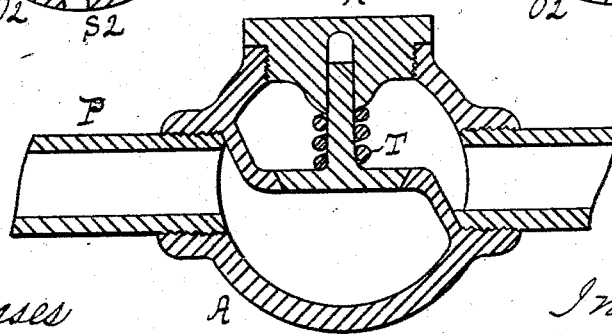

Figure 1 is a diagrammatic elevation of the complete apparatus. Fig. 2 is a longitudinal central section through the check valve A. Figs. 3, 4, 5, and 6 are detail transverse sectional views, taken on a horizontal plane through the four-way cock, showing different positions of the valve plug.

My invention relates to that class of air brake mechanism in which air is compressed by a compressor actuated from the axle of the car, and its object is to relieve the motive power which propels the car from the load of the compressor when the car is starting, and yet to retain a supply of compressed air which may be used to make a second stop before the compressor has been run sufficiently long to compress enough air to actuate the brake.

C represents the axle of the car, N represents an eccentric upon said axle.

D represents an eccentric strap, and I an eccentric rod which is attached to the piston rod of an air compressor J, which may be such as that shown in patent to Louis J. Genett, No. 459,685, dated September 15, 1891, or of any other type in which the suction valves are unseated when pressure in the tank or reservoir reaches a predetermined limit, so that while this limit of pressure is maintained the compressor piston will run freely without doing any work.

B' represents a guide for the piston rod of a compressor, and $u$ represents a cross-head connecting said piston rod with said guide B'.

K and L represent two tanks or reservoirs for compressed air, which may be of the same size, or may be as shown in the drawings of different sizes, the tank or reservoir L as shown in the drawings being the main reservoir from which air is drawn to the brake, and the tank K being an auxiliary reservoir. The tank or reservoir K is connected by a pipe X with the outlet port of the compressor J, and both of said tanks K and L are connected with a four-way cock B, having an actuating handle W, by pipe Q leading from tank K, and pipe R leading from tank L. The four-way cock B is connected by a pipe S with an air brake cylinder M of any known construction, and has also an exhaust pipe O, Fig. 1, to connect with exhaust port $O^2$, Figs. 3 to 6. The valve plug of the four-way cock is provided with an exhaust cavity $O^3$, and with a horizontal channel $O^4$, from which leads a branch channel $O^5$. The casing of the four-way cock is provided with ports $Q^2$, $R^2$, and $S^2$, which connect respectively with the pipe Q, pipe R, and pipe S, shown in Fig. 1. When the valve plug is in the position indicated in Fig. 3, the tank or reservoir L is placed in communication with the auxiliary tank or reservoir K; when the valve plug is in the position indicated in Fig. 4, the tank or reservoir L is placed in communication with the brake cylinder M, when the valve plug is in the position indicated in Fig. 5, the brake cylinder exhausts through port $S^2$, cavity $O^3$, and exhaust port $O^2$; and when the valve plug is in the position indicated in Fig. 6, the auxiliary tank or reservoir K is in communication with the brake cylinder.

I have omitted the details of the air brake cylinder and its connections, because these are well understood and form no part of my invention.

The operation of my invention as above described is as follows: The four-way cock B being placed so that it connects pipes Q and R and closes pipe S and the exhaust, when the compressor J begins to run it compresses air, forces it through pipe X into tank K, whence it flows through pipe Q, cock B, and pipe R into tank L, thus maintaining the pressure in said tanks K and L at substantially the same point. When the pressure in tank K reaches the limit to which the compressor is set to operate, the suction valves of said compressor are unseated (as fully described in said Genett patent) and the compressor piston runs free. Now by turning the four-way cock B in such position as to connect pipes R and S, closing pipe Q and the exhaust, air from tank L passes through pipe R, cock B, pipe S, into brake cylinder M and sets the brake. When the brake is to be released, cock B is so turned as to connect pipe S with the exhaust, closing both said pipes Q and R, thus maintaining the pressure in tank K and holding the suction valves of the compressor unseated, so that when the car is started it will not have to start against the resistance of compressor J. When the car has begun to run, cock B may be turned so as to again connect pipes Q and R and permit the pressure in tanks K and L to equalize, when the compressor will resume work. If however, an immediate stop be desired, and the pressure in tank L has fallen too low to properly actuate the brake mechanism, by turning the four-way cock B so as to connect pipes Q and S, the compressed air in the tank K is made available for the purpose of applying the brake. To guard against the effect of the driver in charge of the car neglecting to turn the cock B so as to connect pipes Q and R after the car has been started, the reservoirs K and L may be connected by a pipe P in which is a check valve A, the valve of which is loaded by a spring T, Fig. 2 to a predetermined pressure less than that which it is desired to keep at all times in reserve. The operation of this device is as follows: Assuming the desired air pressure in tanks K and L to be thirty-five pounds to the inch, and the spring T to exert a pressure on the upper side of the valve sufficient to neutralize an air pressure of ten pounds per square inch on the under side of said valve, then so long as the pressure in tank L is within ten pounds of the pressure in tank K, the valve will remain closed and no air will pass through pipe P. But if the pressure in tank L falls to or below twenty-five pounds per square inch while the pressure in tank K remains at thirty-five pounds, then the excess of pressure in tank K will unseat valve A and air will flow into tank L until the pressures in said two tanks are brought within ten pounds of each other, when the valve A will again close.

In the diagram Fig. 1 shows the position of the handle W of the four-way cock B, position E represents pipes Q and R connected, position F showing said cock turned to connect said pipe S and the exhaust, position G showing the cock turned so as to connect pipes R and S, and position H showing the cock turned so as to close all its ports, which last position is not necessary except in cases where two four-way cocks are used at opposite ends of the car, so that the driver may use the one at the front end and leave the one at the rear end closed.

In my invention an air compressor, which is thrown out of action in any way by the pressure of air compressed by it, whether by unseating the suction valves, or by breaking the driving action, is combined with a receiver or tank, the pressure in which is not diminished by the act of applying the brake, so that when the car is started the air compressor is not compressing air.

What I claim as my invention, and desire to secure by Letters Patent, is—

1. In combination with an air compressor of the type which is governed by the resistance of compressed air, a reservoir for compressed air connected directly with the compressor, a second reservoir for compressed air connected with said first reservoir, an air brake cylinder, and a four-way cock controlling the connections between said two reservoirs and also controlling a connection from said cock to said air brake cylinder, whereby said reservoirs may be connected together, or either may be connected with said air brake cylinder, substantially as shown and described.

2. In combination with an air compressor of a type whose action is regulated by the resistance of the air compressed, two reservoirs for the storage of air, one of which is directly connected with the air compressor and the other one of which is connected with said first named reservoir, a connection from said second reservoir to the air brake cylinder, and means for closing the connection between said reservoirs in opening the connection from said second reservoir to said air brake cylinder, substantially as shown and described.

3. In combination with an air compressor J and means for operating the same, a reservoir K connected directly with said compressor, a reservoir L for storage of compressed air connected with said reservoir K, a four-way cock B in the connection between said two reservoirs, and an air brake cylinder M connected with said four-way cock, substantially as shown and described.

4. In an air brake mechanism, the combination with an air compressor of the type whose operation is controlled by air pressure, of a regulating reservoir connected with the discharge port of said compressor, a car reservoir for compressed air, an air brake cylinder, and means, substantially such as described, whereby said compressed air reservoir may be connected either with said regulating reservoir or said air brake cylinder, substantially as and for the purpose set forth.

MOSES L. ROTHSCHILD.

Witnesses:
JAMES H. MOORE,
PHILIP OTTER.